F. CHATFIELD.
FABRIC CUTTING MACHINE.
APPLICATION FILED DEC. 14, 1915.

1,243,673.

Patented Oct. 16, 1917.
6 SHEETS—SHEET 4.

WITNESSES
M. P. McInnis
E. A. Pavel

INVENTOR
FRANKLIN CHATFIELD
BY Paul & Paul
ATTORNEYS

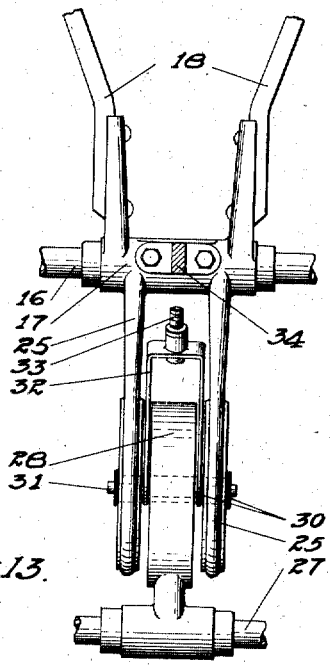
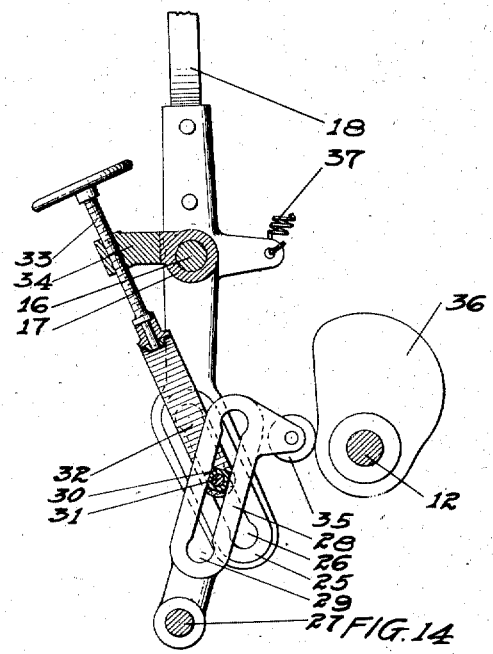
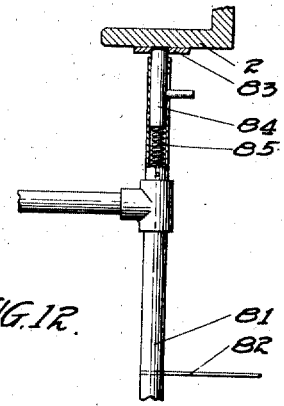
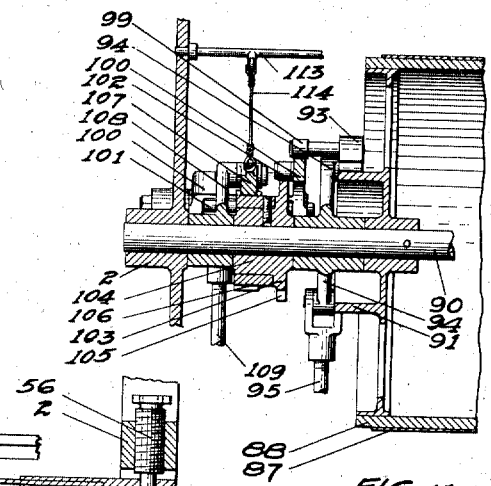
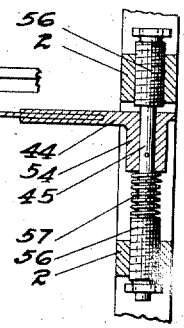

UNITED STATES PATENT OFFICE.

FRANKLIN CHATFIELD, OF MINNEAPOLIS, MINNESOTA.

FABRIC-CUTTING MACHINE.

1,243,673.   Specification of Letters Patent.   Patented Oct. 16, 1917.

Application filed December 14, 1915. Serial No. 66,701.

*To all whom it may concern:*

Be it known that I, FRANKLIN CHATFIELD, citizen of the United States, resident of Minneapolis, county of Hennepin, State of Minnesota, have invented certain new and useful Improvements in Fabric-Cutting Machines, of which the following is a specification.

The object of my invention is to provide a machine for feeding strips of knit fabric and cutting it into lengths suitable to form the cuffs of a knit garment.

A further object is to provide a machine in which the feeding of the fabric or severing of it at predetermined intervals and the stacking of the severed pieces into piles, each containing a predetermined number of pieces, can be automatically and expeditiously performed.

The invention consists generally in various constructions and combinations, all as hereinafter described and particularly pointed out in the claims.

Figure 1:
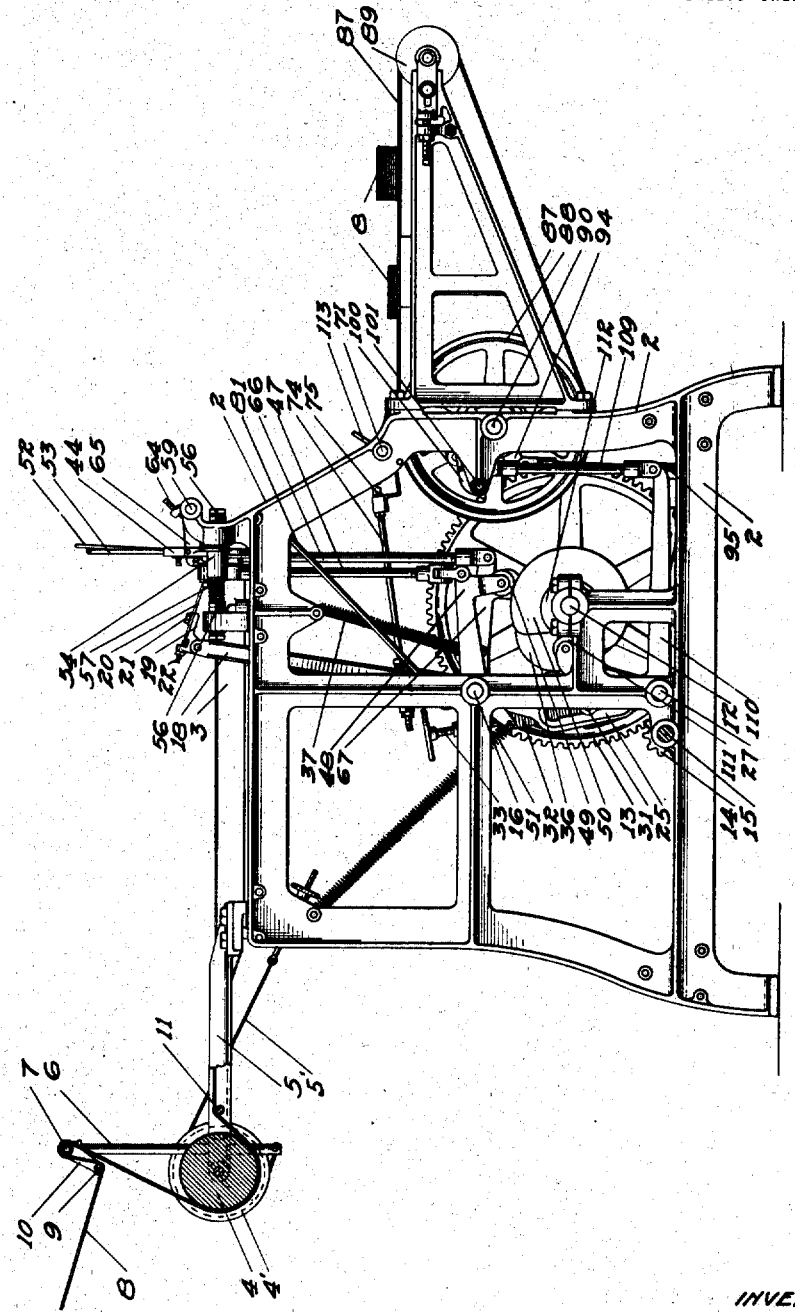
Figure 2:
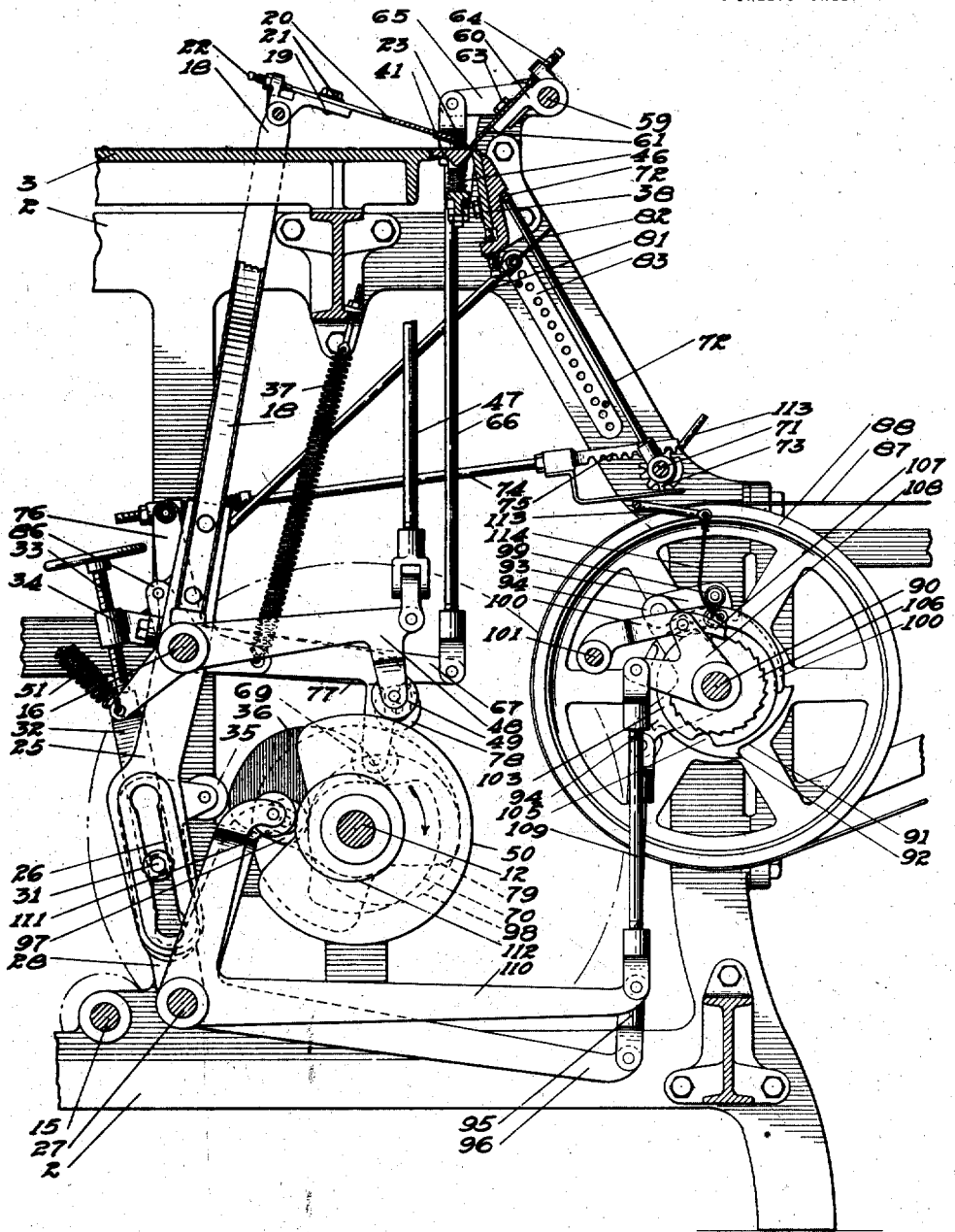
Figure 3:
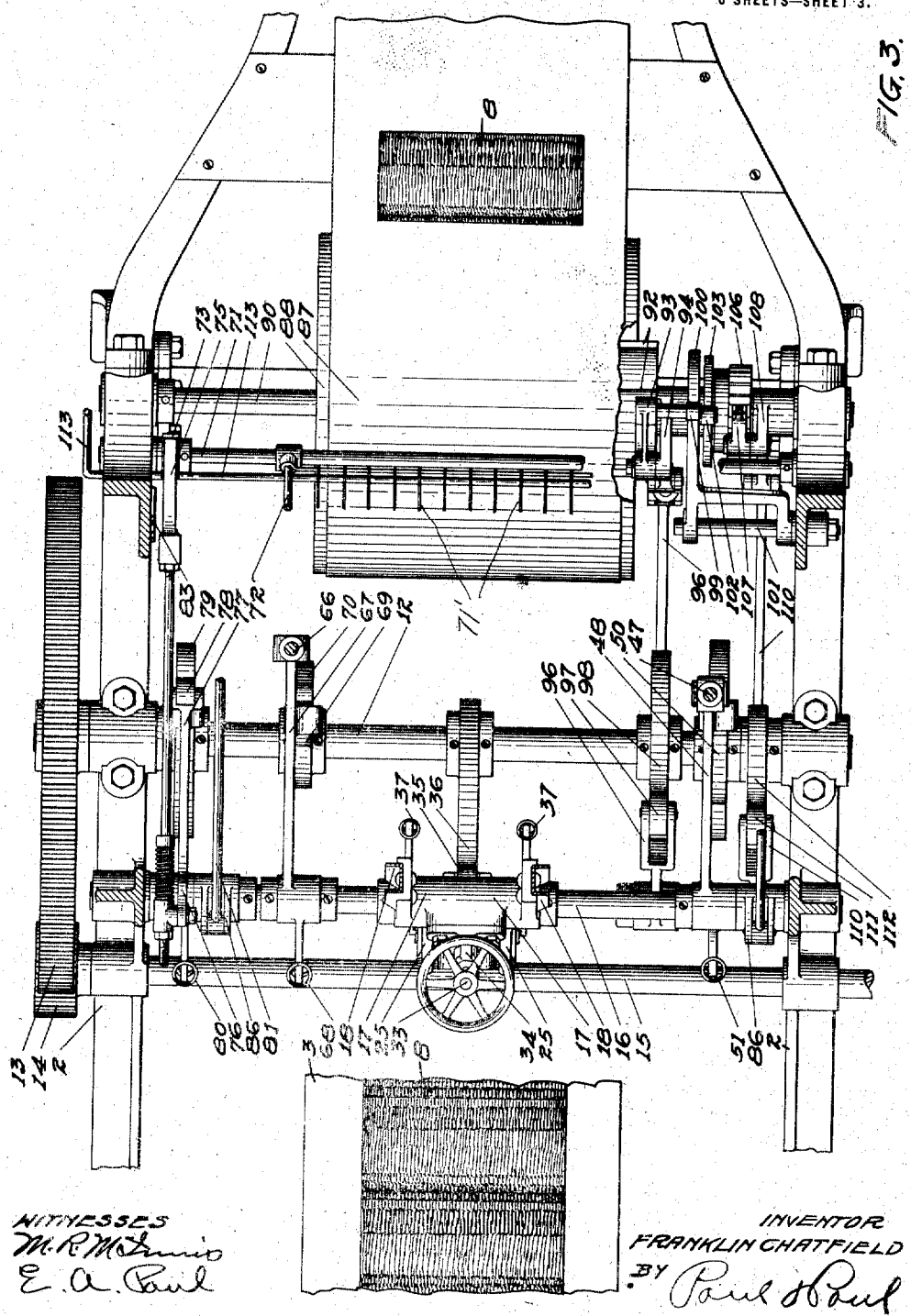
Figure 4:
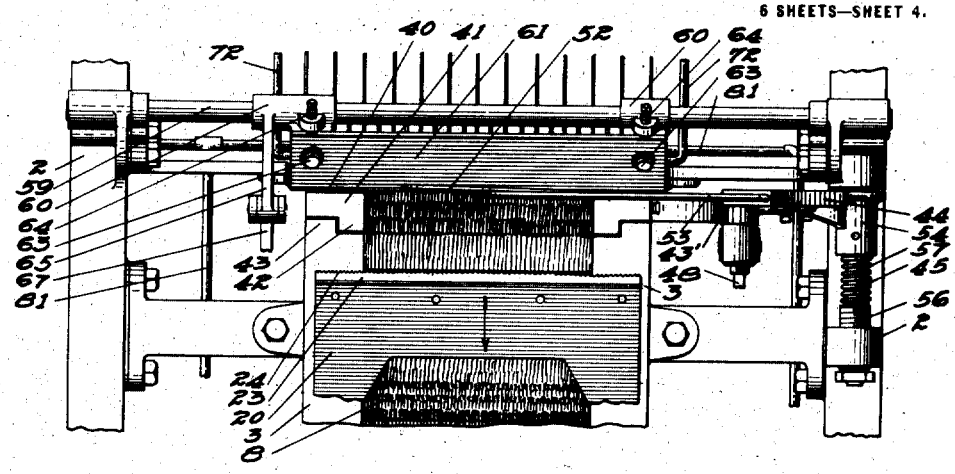
Figure 5:
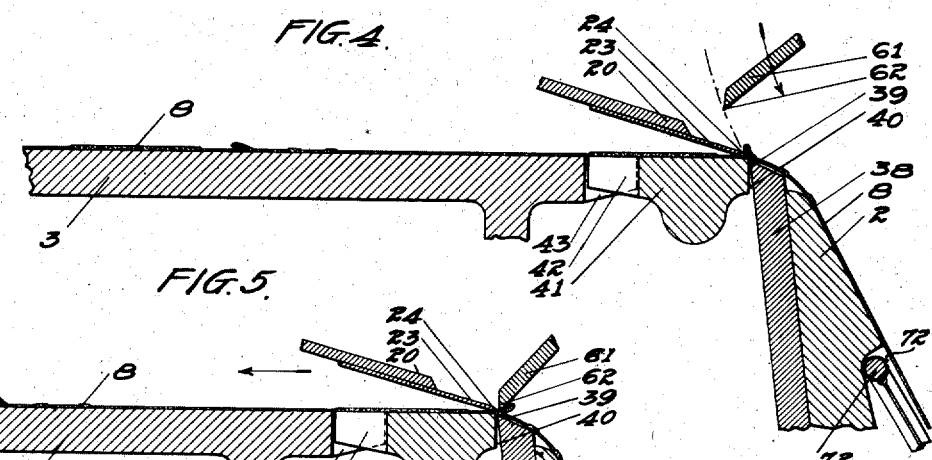
Figure 6:
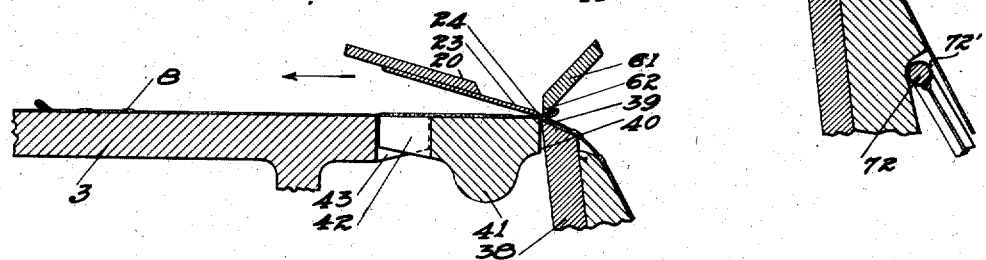
Figure 7:
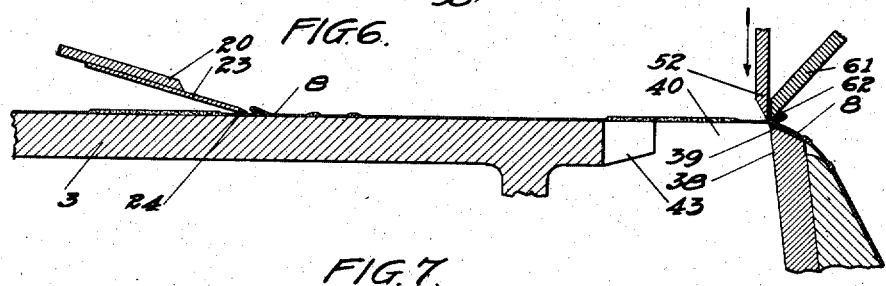
Figure 8:
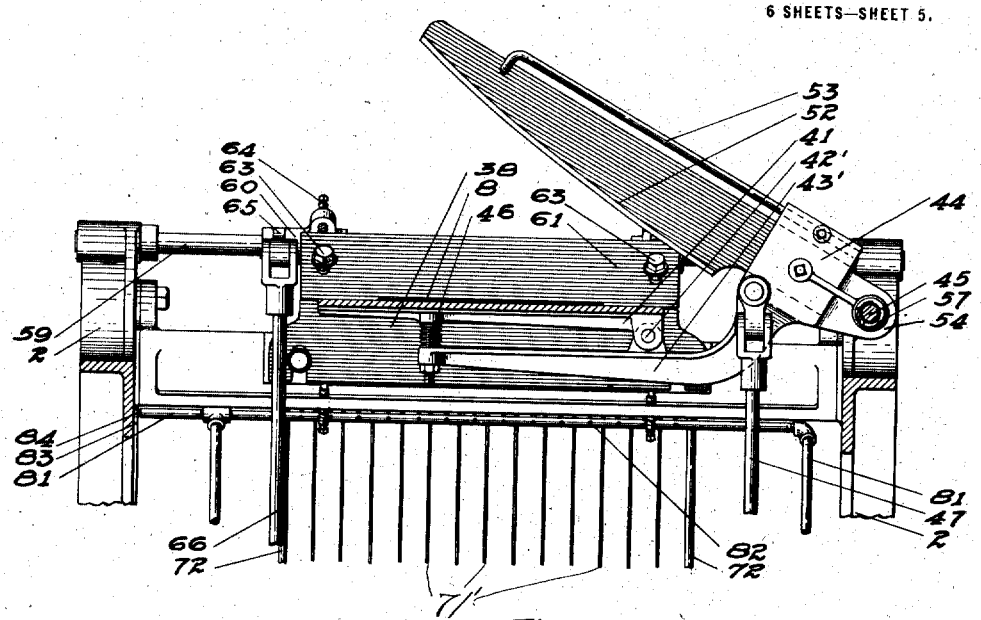
Figure 9:
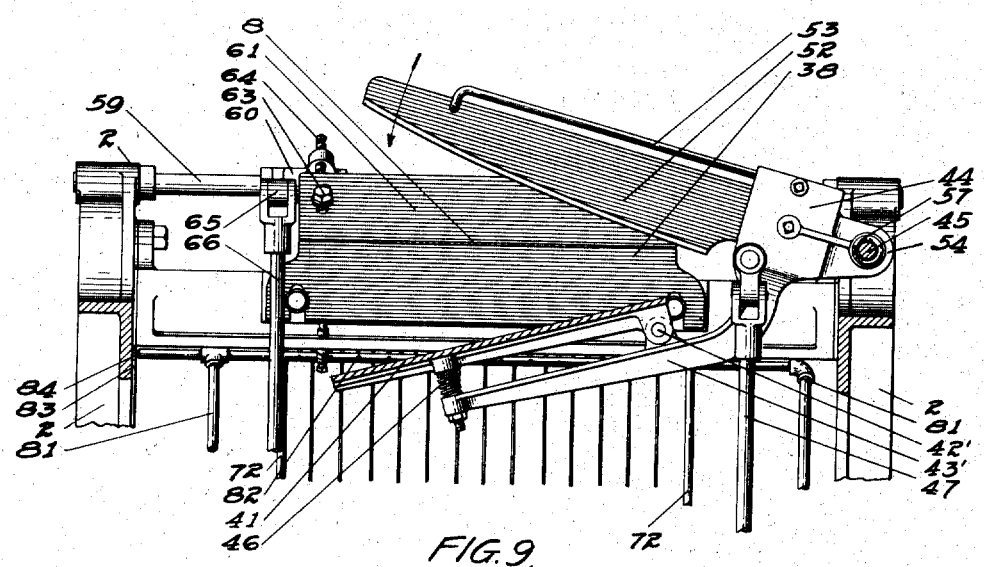

In the accompanying drawings forming part of this specification,

Figure 1 is a side view of a fabric feeding machine embodying my invention, shown partly in section, Fig. 2 is a vertical sectional view of the delivery end of the machine, Fig. 3 is a plan sectional view of the same, Fig. 4 is a plan view of the severing mechanism, Figs. 5, 6 and 7 are detail sectional views showing the successive steps in the feeding and severing operation, Figs. 8 and 9 are detail sectional views of the severing knife, showing its normal position and the position it assumes during the severing operation, Fig. 10 is a detail sectional view showing the preferred manner of mounting the knife to permit of lateral movement thereof, Fig. 11 is a detail sectional view, showing the step by step mechanism for operating the belt upon which the pieces of fabric are deposited, Fig. 12 is a detail view of the supporting device to which the pieces of fabric are delivered and the means for adjusting this device to adapt it for different lengths of the fabric pieces.

Figs. 13 and 14 are detail sectional views of the mechanism for changing the stroke of the feeder to accommodate it to the different lengths of the fabric strip.

In the drawing, 2 represents the frame of the machine, supporting a suitable feed table 3 over which the fabric is fed to the severing mechanism. A friction roll 4 is supported by brackets 5 upon said frame. An arm 6 is carried by said brackets and extends above said roll and is provided with a rod 7 over which the fabric strip 8 is passed and from thence carried under the roll to the feed table. A rod 9 has arms 10 loosely mounted on the rod 7 and adapted to rest by gravity on the strip of fabric to hold the same under tension and a rod 11 is preferably mounted in the brackets 5 over which the fabric passes to the feed table. This device is merely for taking up the slack in the fabric and may be varied in different ways to accomplish the same result.

For the purpose of increasing or decreasing the resistance of the roll 4 to the pull of the fabric and thereby regulate the feed, I prefer to provide a sheave 4' connected to the roll 4 and having a cable 5' attached at one end to the arm 6 and passing over the sheave to a suitable connection on the machine frame. This connection is capable of adjustment to increase or decrease the tension of the cable 5' and the friction between it and the sheave, thereby regulating the feed of the fabric.

12 is a driven shaft, having a gear 13 meshing with a pinion 14 of a drive shaft 15 that is operated from a suitable source of power, not shown. 16 is a shaft, parallel with the shaft 12 and on which a hub 17 is centrally mounted. Arms 18 are carried by this hub and project upwardly therefrom to straddle the feed table 3. A carrier 19 is pivotally supported upon the ends of the arms 18 above the feed table and a plate 20 is seated on said carrier and adjustable thereon by means of bolts 21 and adjusting screws 22 mounted to engage the rear edge of the plate 20.

A feeder blade 23 is secured to the forward edge of the feed plate and is preferably provided with a serrated edge 24 to engage the rib or raised area formed at intervals in the fabric and feed it to the severing mechanism. These ribs are knit in the fabric and provision is made, as will subsequently appear, for severing the fabric close up to the ribs so that when the cuffs are put on the garment, the ribs will form the outer edge or selvage. This feeding and severing operation will be subsequently described more in detail.

It is desirable in a feeding device of this kind to provide means for varying the stroke of the feeder and to accomplish this I prefer to employ the following mechanism: 25 represents arms, depending from the hub 17 and having longitudinal slots 26 therein. 27 is a shaft, parallel with the shaft 16 and beneath the same and on which an upwardly projecting arm 28 is mounted, having a longitudinal slot 29 corresponding to the slot 26. The arm 28 projects between the arms 25 and blocks 30 are mounted to slide in the slots 26 and 29 in said arms and are connected to one another by a pin 31. A fork 32 is mounted on said pin between the arms 25 and a screw 33 has a threaded engagement with an arm 34 on the hub 17 and is connected with the fork 32 for moving the pin 31 back and forth and varying the distance between the hub 17 and the connection of the arm 28 with the arms 25 to vary the stroke of the feeder supporting arms 18. An anti-friction roller 35 is mounted on the arm 38 in position to engage the cam 36 on the shaft 12. Revolution of this cam will impart a rocking movement to the feeder arms to move the feeder over the table and advance the fabric. Springs 37 are provided in connection with the hub 17 for holding the roller 35 against the face of the cam and returning the feeder to the beginning of its stroke.

The movement of the parts is so timed that the stroke of the feeder corresponds substantially to the distance of the fabric between the ribs or raised portions, so that when the feeder is drawn backward after the advance portion of its stroke, it will slide over a rib and be in position to engage it and feed the fabric as soon as forward movement is begun, and through the medium of the tension device at the receiving end of the feed table heretofore described, the fabric will be drawn so that the feeder will be in contact with a rib and movement of the fabric will begin with the initial forward movement of the feeder. There will thus be no lost motion in the feeding operation.

At the discharge end of the feed table I provide a stationary knife 38 having a beveled edge 39 between which and the table is a gap 40 normally closed by a block 41, which preferably has projections 42 formed thereon interlocking with similar projections 43 on the end of the table for the purpose of presenting an irregular or broken line at their point of intersection and preventing the fabric from catching and retarding the feeding operation.

The block 41 has a pivotal support 42' on an arm 43 that is mounted on a knife carrier 44 that is secured on a shaft 45. The block 41 also has a yielding bearing 46 on one end of the arm 43', said bearing allowing the block to be depressed on its pivot 42' independently of its movement with the arm 43'. A rod 47 is connected with the carrier 44 and is attached at its lower end to an arm 48 that is mounted on the shaft 16 and provided with an anti-friction wheel 49 which engages the face of a cam 50 on the shaft 12.

A spring 51 normally holds the rod 47, the carrier 44 and the parts supported thereby in a raised position, with the block 41 flush substantially with the top of the feed table. A movable knife 52 is mounted at one end in the carrier 44 and has a beveled edge to make a shear cut with the edge of the stationary knife 38. The blade of the knife 52 is preferably flexible and the point of the knife is preferably bent outwardly to overhang the blade of the stationary knife by the tension of a rod 53 that is mounted at one end in the carrier 44 and has its opposite end fitted into a socket near the point of the knife blade. The carrier 44 has a hub 54 secured on a shaft 45 that is mounted to rock and slide lengthwise in adjustable bearing sleeves 56, (see Fig. 10) a spring 57 being provided between said hub and one of said bearing sleeves.

The shaft 45 may be moved lengthwise in either direction and the tension of the spring 57 increased or decreased by the adjustment of one of said sleeves in its bearing, the spring 57 operating to hold the knife blade yieldingly toward the cutting edge of the stationary blade, the other sleeve serving as a stop for the knife.

Mounted in the machine frame above and adjacent to the stationary knife is a shaft 59 having hubs 60 journaled thereon and provided with bearings for an oscillating blade 61 provided with a beveled edge 62 and adjustable toward and from the edge of the stationary knife by means of bolts 63 and adjusting screws 64. One of the hubs 60 is provided with an arm 65 to which a vertically arranged rod 66 is pivotally connected at its upper end, the lower end of said rod being connected to an arm 67 that is mounted on the shaft 16 and is normally held in its depressed position by a spring 68. The arm 67 is provided with an anti-friction roller 69 mounted to bear on the face of a cam 70 to hold said blade in its raised position. The movement of this blade 61 is so timed that it will swing down toward the beveled edge of the stationary knife while the fabric is being advanced by the feeder and will reach a point near the edge of the stationary knife when a rib of the fabric is passing between them, and the lower edge of the blade 61 contacting with the rear face of the rib will tilt it outwardly, as indicated in Figs. 6 and 7 and momentarily grip the fabric and hold it against the edge of the stationary knife while the movable knife is descending to make a shear cut through the fabric. The blade 61, besides its function of bending the welt over the stationary knife preparatory to the severing operation, also has the function when it bends the welt of drawing the fabric taut between the feeder and the point where it is folded over the stationary knife. This insures a uniform length of the severed sections. This will insure a uniform severing of the fabric into the cuff pieces and the proper synchronizing of the movement of the fabric with the stroke of the feeder.

71 is a shaft, mounted in the machine frame and having a yoke 72 provided with a series of wires 71' mounted in said yoke at intervals and projecting upwardly in parallel relation with one another between the arms of the yoke. The upper end of the yoke fits within a depression in the frame of the machine, (see Fig. 5) and is provided with a series of pin points 72' which engage the severed piece of fabric and insure its delivery to the pile beneath.

The shaft 71 is mounted to rock in its bearings and is operated through a pinion 73 and a rod 74 having a rack bar 75. One end of the rod 74 is connected to an arm 76 that is mounted on the shaft 16 and provided with an arm 77 having an anti-friction roller 78 that is yieldingly held in engagement with the face of a cam 79 on the shaft 12 by a spring 80. Through the medium of this cam the arm 76 is rocked intermittently to swing the yoke 72 outwardly and deposit the severed pieces of fabric in a pile one upon another.

For the purpose of adapting the machine for cuffs of different length I prefer to provide a yoke 81 having a series of fingers 82 mounted to project between the wires in the yoke 72 and form a support for the fabric pieces thereon. This yoke is adjustable in a perforated bar 83 by means of a sliding pin 84 and a spring 85, said pin engaging the perforations in the bar and supporting the yoke at the desired elevation. The ends of the yoke are mounted in hubs 86 which are free to rock on the shaft 16 to allow the yoke to swing forward or backward thereon and accommodate itself to the position of the perforations in the plate 83. The severed pieces of fabric are preferably deposited by the yoke 72 upon a carrier belt 87 operating horizontally on drums 88 and 89 which have bearings in the machine frame and for the purpose of regulating the number of cuff pieces deposited in a pile I prefer to provide means for perating the carrier belt intermittently. The period of operation of the belt may, of course, be varied, but I prefer to provide a mechanism which will cause its operation when piles of fabric have been made containing twenty-four pieces or two dozen, the garments being usually handled in dozen lots and fractions of dozens.

The drum 88 has its hub secured on a shaft 90 and provided with an annular flange 91 having a series of teeth 92 in its periphery. A dog 93 is pivoted at one end on one arm of a bell crank 94 that is loosely mounted on the shaft 90 and has its opposite arm connected by a rod 95 with a bell crank 96 that is pivoted on the shaft 27 and provided with an anti-friction wheel 97 which contacts with the face of a cam 98 on the shaft 12. This dog 93, when allowed to drop down to a working position, will engage a notch 92, and revolve the carrier belt drum and move the belt one step. Normally, this dog is held out of engagement with a notch 92 by a roller 99 which rides upon an arm 100 that is pivoted on a rod 101 on the machine frame. A roller 102 is carried by the arm 100 and rides upon an annular flange 103 of a hub 104 that is loosely mounted on the shaft 90, said flange having a recess 105 in its periphery to allow the roller 102 to drop therein and depress this arm 100 sufficiently to allow the dog 93 to engage one of the notches 92. The hub 104 has a ratchet 106 thereon, provided with twenty-four teeth and a pawl 107 is pivoted on a bell crank 108 that is loosely mounted on the shaft 90, so that when this bell crank is rocked, its movement in one direction will engage the pawl 107 with the teeth of the ratchet and revolve the hub 104, and once in the revolution of the ratchet the roller 102 will drop into the recess 105 and allow the dog 93 to engage a tooth 92 and move the drum and the carrier belt one step. This movement of the carrier belt will advance the pile of fabric cuffs or pieces out of the path of the delivering device and permit the beginning of another pile.

The bell crank 108 is connected by a rod 109 with a bell crank 110 also mounted on the shaft 27 and having an anti-friction bearing 11 upon a cam 112. It is sometimes desirable in case there is a defect in one of the fabric pieces to remove it from the pile and cause the machine to feed another piece to the same pile and thereby prevent a break in the count. This I accomplish by providing a hand operated crank 113 having a flexible connection 114 with the pawl 107. The operator, noticing a defect in the piece of fabric as it comes out of the machine, can remove it from the pile and raise the pawl 107 and temporarily arrest the movement of the ratchet mechanism until the machine has delivered a perfect piece of fabric in place of the defective one. The count will then be resumed.

I claim as my invention:

1. In combination, with a feed table and a feeder operating thereon having means to engage the raised areas in a fabric to feed the same, a shearing blade, and means for automatically engaging the raised areas in the fabric to bend the same outwardly to clear said shearing blade.

2. The combination, with a feed table and a reciprocating feeder operating thereon to engage raised areas of a fabric to feed the same, a stationary knife, a shearing knife coöperating therewith to sever the fabric, and means for bending the raised areas out of the path of said shearing knife and tensioning the fabric between said feeder and the point of engagement of said bending means.

3. In combination with a feed table and a feeder operating thereon, a stationary severing blade, a movable blade, and means for folding the fabric over said stationary blade preparatory to the severing operation, said means moving in the direction of travel of the fabric.

4. In combination with a feed table, a feeder operating thereover adapted to engage the raised areas of a fabric thereon to feed the same, a stationary blade, means having a movement in the direction of travel of the fabric for engaging said raised areas to bend them outwardly over said stationary blade, and a severing blade coöperating with said stationary blade to sever the fabric.

5. In combination, with a feed table and means for feeding a fabric with raised areas thereon, a stationary blade having a cutting edge, a blade mounted to swing toward and from said stationary blade to engage the raised areas of the fabric and clamp it over said stationary blade, and a severing knife coöperating with said stationary blade.

6. In combination with a feed table and a stationary blade whereto the fabric to be severed is delivered from said table, a gap being formed between said table and said blade, means normally closing said gap for directing the fabric thereover, and over the edge of said blade, a severing knife coöperating with said stationary blade to sever the fabric, said gap closing means being mounted to move and expose said gap during the severing operation.

7. In combination with a feed table and a stationary blade whereto the fabric to be severed is delivered from said table, a gap being formed between said table and said blade, means normally closing said gap for directing the fabric thereover and over the edge of said blade, a severing knife coöperating with said stationary blade, to sever the fabric, said gap closing means being mounted to move simultaneously with said knife to expose the gap in said table.

8. In combination, with a feed table, a stationary knife spaced from the discharge end of said table, means normally filling the gap between said knife and table, a rocking carrier having an arm whereon said gap closing means is mounted, a movable knife mounted in said carrier, said gap closing means being withdrawn from the opening in said table simultaneously with the descent of said movable knife.

9. The combination, with a feed table and a stationary knife spaced therefrom, a block normally closing the gap between said table and knife, a movable knife carrier, a knife mounted therein, said carrier having an arm whereon said gap closing means is yieldingly supported, and movable simultaneously with said carrier to expose the gap between said blade and table.

10. The combination, with a feed table over which the fabric to be severed is fed, of a stationary blade spaced from said table, a movable blade coöperating with said stationary blade to sever the fabric, a block normally closing the gap between said table, a swinging blade for directing the fabric over said stationary blade, a support for said block having a hinged connection at one end therewith and a yielding support at the opposite end, and means for withdrawing said block from said gap simultaneously with the descent of said movable blade.

11. The combination, with a feed table, of a feeder mounted to engage welts in a fabric to feed the same over said table, a stationary member, a movable member having a limited stroke in the same direction substantially as the moving fabric and positioned to contact with a welt and bend it over said stationary member to grip the fabric, said feeder returning to its initial feeding position during such movement, and means for severing the fabric adjacent to the welt so held.

12. The combination, with a feed table, of a feeder operating thereon for engaging the welts of a fabric to feed the same, means for gripping a welt and the fabric to tension the latter, said feeder returning to its initial feeding position during the gripping operation, and a severing means positioned to sever the fabric adjacent to said gripping means, said gripping means bending the welt forwardly out of the path of said severing means.

13. In combination with a feed table, a feeder operating to engage the raised areas of a fabric to feed the same, a stationary member, means operating in the direction of the moving fabric for engaging said raised areas to fold them over said stationary member, and means coöperating with said stationary member to sever the fabric.

14. The combination, with a feed table, of a feeder mounted to engage welts in the fabric to feed the same, a member having a stroke in the direction substantially of the moving fabric and positioned to contact with a welt and bend it outwardly to grip the fabric, said feeder returning to its initial feeding position during such movement, and means for severing the fabric adjacent to the welt so held.

15. The combination, with a feed table and a feeder operating therein to engage raised areas of a fabric to feed the same, the stroke of said feeder corresponding substantially to the distance between the ribs of the fabric, said feeder in its backward movement sliding over a raised area and positioned to engage it upon its initial forward movement, and means including a stationary and a movable member engaging said raised area for tensioning the fabric to draw the said raised area against the face of the feeder.

16. The combination, with a feed table, and means for feeding a fabric having welts or ribs thereon at intervals, of means for severing the fabric adjacent to the welts, and means having a limited movement in the direction of travel of the fabric for drawing the fabric taut between said feeder and the point of severance of the fabric.

In witness whereof, I have hereunto set my hand this 10th day of December, 1915.

FRANKLIN CHATFIELD.

Witnesses:
GENEVIEVE E. SORENSEN,
EDWARD A. PAUL.